(12) United States Patent
Eguchi (10) Patent No.: US 6,574,670 B1
(45) Date of Patent: Jun. 3, 2003

(54) ELECTRONIC MAIL-CAPABLE COMMUNICATIONS TERMINAL DEVICE AND ELECTRONIC MAIL COMMUNICATIONS METHOD

(75) Inventor: Masashi Eguchi, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/114,573

(22) Filed: Jul. 13, 1998

(51) Int. Cl.[7] .............................................. G06F 15/16
(52) U.S. Cl. ........................ 709/245; 709/219; 709/236
(58) Field of Search ................................ 709/204, 205, 709/206, 219, 233, 236, 245

(56) References Cited

U.S. PATENT DOCUMENTS

| 5,406,557 | A |   | 4/1995  | Baudoin |         |
| 5,493,564 | A |   | 2/1996  | Mullan |         |
| 5,548,789 | A |   | 8/1996  | Nakanura |         |
| 5,577,202 | A |   | 11/1996 | Padgett |         |
| 5,757,669 | A | * | 5/1998  | Christie et al. | 709/205 |

FOREIGN PATENT DOCUMENTS

WO    WO94/06230    3/1994

OTHER PUBLICATIONS

Berners–Lee, T. RFC 1630:Universal Resource Identfiers in WWW. Internet Engineering Task Force, Jun. 1994.*
Brachman et al., "A Simulation Study of Application Level Message Transfer Using Message Streams", Computer Network and ISDN Systems, Oct. 19, 1990, pp. 79–94.
European Search Report dated Jun. 18, 1999 for application No. EP 98112998.

* cited by examiner

*Primary Examiner*—Zarni Maung
*Assistant Examiner*—Gregory Clinton
(74) *Attorney, Agent, or Firm*—Hogan & Hartson, LLP (57) ABSTRACT

The communications terminal device stores data about a kind of a network used by a user of the communications terminal device in relation to a user code. The communications terminal device also stores data about a kind of a network used by a recipient of electronic mail in relation to a recipient name. When the network of the electronic mail sender is different from the network of the recipient, an electronic mail address of the recipient is modified so that the electronic mail being sent can be transmitted between the different networks.

20 Claims, 6 Drawing Sheets

| CODE NO. | USER ID | PASSWORD | NETWORK |
|---|---|---|---|
| 1234 | MW0727 | 34577 | Nifty |
| 3450 | abcd | 9876 | PCVAN |

| RECIPIENT NAME | EMAIL ADDRESS | NETWORK |
|---|---|---|
| X | yama@kawa.co.jp | internet |
| Y | MMM02730 | Nifty |
| Z | 12345.678 | CIS |

| FROM | TO | PREFIX |
|---|---|---|
| Nifty | internet | INET: |
| Nifty | CIS | CIS> |
| CIS | internet | INTERNET: |

| TELEPHONE NUMBER | NETWORK |
|---|---|
| 0752135268 | Nifty |
| 0753211111 | PCVAN |

FIG. 5(a) | INET:yama@kawa.co.jp

FIG. 5(b) | CIS>12345.678

FIG. 5(c) | INTERNET:yama@kawa.co.jp

| USER CODE | USER ID | PASSWORD | NETWORK |
|---|---|---|---|
| 1234 | MW0727 | 34577 | Nifty |
| 3450 | abcd | 9876 | PCVAN |

| RECIPIENT NAME | EMAIL ADDRESS | NETWORK |
|---|---|---|
| X | yama@kawa.co.jp | internet |
| Y | MMM02730 | Nifty |
| Z | 12345.678 | CIS |

| SENDER'S NETWORK | RECIPIENT'S NETWORK | MAXIMUM DATA SIZE |
|---|---|---|
| Nifty | Nifty | 160KB |
| Nifty | internet | 160KB |
| CIS | Nifty | 160KB |
| CIS | internet | 1.4MB |
| internet | internet | UNLIMITED |
| internet | Nifty | 160KB |

ELECTRONIC MAIL-CAPABLE COMMUNICATIONS TERMINAL DEVICE AND ELECTRONIC MAIL COMMUNICATIONS METHOD

BACKGROUND OF THE INVENTION

1. Field of the Invention

The present invention generally relates to a communications terminal device like an electronic mail-capable facsimile machine, and more specifically, to a communications terminal device provided with an electronic mail function that simplifies the electronic mail transmission operation, an electronic mail communications method related to this device, and a computer usable medium related to this device.

2. Description of the Related Art

Recently, computer networks wherein LANs (local Area Networks) and individual personal computers are connected over communications lines like telephone lines have become prevalent. Internet and a personal computer communications service network are examples of such computer networks. The personal computer communications service network includes, for instance, NIFTY-Serve ("NIFTY") and PC-VAN. These computer networks are separate networks, but cross-communications between the different networks is possible.

When a user uses one of these computer networks, the user does not communicate directly with the other party. In case of Internet, a user communicates to the other party via one of a plurality of Internet Service Providers (an "ISP") who provides a computer (a server) for network communications. In case of personal computer communications network, a user communicates to the other party via a host who provides a host computer for network communications. The host administrates connection to the network. When the user utilizes the computer network, the user connects with the provider or an access point of the host via the telephone line, and performs a log-in procedure in order to have the user itself verified as a registered user. In this log-in procedure, the user must input a user name (user ID) and secret password. Successful logging-in is logically equivalent to successful connection of the user's communications terminal device with the computer communications network.

There are many different kinds of services available in the computer networks, but the following description concerns itself only with electronic mail (email) transmission over the Internet. When the user transmits the data in the form of electronic mail of predetermined format, this electronic mail contains both the electronic mail address of the sender and that of the recipient. These electronic mail addresses each contain information about their respective providers. Thus properly addressed, the electronic mail is then sent to and stored in a mailbox at the ISP of the receiving party. A person at the receiving end can then retrieve the electronic mail from his or her mail box at his or her convenience. The electronic mail address includes a user ID that expresses in characters an IP (Internet Protocol) address based upon the domain name system (DNS) instead of only in numbers.

The advantages of such a computer network are that an excellent communications method that allows errors to be easily corrected can be employed, and the user can communicate with far away parties on only the cost of communications with his or her nearest ISP or nearest access point to the network.

Facsimile machines which conventionally send and receive image data over telephone lines have proliferated, and this has led to the establishment of communications protocols and methods for facsimile data communications. These communications protocols and methods are different from those of the computer networks, so conventional facsimile machines cannot be connected to the computer networks.

The present assignee previously proposed a facsimile machine provided with electronic mail functionality such that image data is converted to an electronic mail format for communications over the computer network (a pending U.S. patent application Ser. No. 08/871,136, filed Jun. 6, 1997, now U.S. Pat. No. 6,374,291, and entitled "COMMUNICATION METHOD AND COMMUNICATION TERMINAL APPARATUS" or Japanese Patent Application No. 8-145315 filed Jun. 7, 1996 entitled "COMMUNICATION TERMINAL DEVICE", published Dec. 16, 1997 with Laid-Open Publication No. 9-325924).

In general, facsimile machines are not only used by single users, but are often used in places like offices where a single facsimile machine must be shared by multiple users. When an electronic mail-capable facsimile machine is used by multiple users, each user may use a different provider or network. Accordingly, each user may have a different provider or access point and therefore a different phone number must be dialed along with a different log-in procedure when the user wants to send an electronic mail. For logging-in, the user must enter the user name (user ID) and secret password. Further, since the electronic mail must also contain the addresses of the sender and recipient of the electronic mail, this information must also be input by the user (sender). The electronic mail address for the Internet consists of a relatively large number of digits including numerals, Roman characters and symbols. Thus, it is sometimes troublesome for the user to enter the electronic mail address to its device.

In addition, if the network of the electronic mail recipient is not the same as the sender's network, the electronic mail is transmitted between different networks, for example, between NIFTY and the Internet, or vice-versa. In this case, the electronic mail address must be adjusted such that it can be used between the different networks.

These problems are not limited to facsimile devices, but also must be dealt with by electronic mail-capable communications terminal devices shared by multiple users.

Furthermore, depending on the kinds or natures of the network, there may also be a restriction on the amount of data that can be transmitted in a single electronic mail ("mail size limitation"). Because of this, an electronic mail cannot be sent if it contains a lot of data, or in other words, if the mail size is very large. Moreover, when an electronic mail is sent from a network which does not restrict the size of an electronic mail (or which can deliver a large size of mail) to a network that has such a restriction (or that can only deliver a small size of mail), the electronic mail that exceeds the mail size limitation of the network with the restriction will be unsendable.

SUMMARY OF THE INVENTION

It is an object of the present invention to provide a communications terminal device and method which can simplify an operation when an electronic mail is sent, thereby solving the above-described problems.

It is another object of the present invention to provide an electronic mail-capable communications terminal device and method which can determine an appropriate electronic mail size for transmission between differing networks.

In order to accomplish the aforementioned objects, the present invention provides an electronic mail-capable communications terminal device which includes a first storage means for storing data specifying kinds (natures/names) of networks used by multiple users of the device in relation to these users respectively, a second storage means for storing data specifying kinds of networks used by multiple recipients of electronic mail in relation to these recipients respectively, and a means for modifying an electronic mail address of a recipient so that the electronic mail being sent can be transmitted between different networks when the network of the electronic mail sender and the network of the recipient are different.

Since the communications terminal device determines whether or not an electronic mail is being transmitted between differing networks, the user does not need to be concerned about the kind of the network of the recipient. Since the communications terminal device modifies the address of the recipient when an electronic mail is sent between differing networks, the user does not have to adjust the electronic mail address, and misaddressed electronic mails can be avoided.

The electronic mail address modification may be carried out in such a manner that a pre-stored string of characters to allow an electronic mail to be transmitted between different networks is added to the electronic mail recipient's address depending upon the network of the addressee.

Further, the present invention provides an electronic mail communications method which includes a step of storing kinds (natures) of networks used by multiple users of an electronic mail sending device in connection to these users respectively, a step of storing kinds of networks used by multiple recipients of electronic mail in connection to these recipients respectively, and a step of modifying an electronic mail address so that the electronic mail is transmitted between different networks when the network of the electronic mail sender and that of the recipient are not the same.

The present invention also provides a computer readable (usable) medium comprising a first module for storing data about kinds of networks used by a plurality of users (senders) of an electronic mail communication device in relation to these users respectively, a second module for storing data about kinds of networks used by multiple electronic mail recipients in relation to these recipients respectively, and a third module for modifying a recipient's electronic mail address so that the electronic mail is transmitted between different networks when the networks of the electronic mail sender and recipient are different.

The "computer usable medium" in this specification including the appended claims covers any physical objects in which a program to be executed by CPU is stored. For instance, the "computer usable medium" may be a floppy disk, CD-ROM, a hard disk drive, ROM, RAM, an optical recording medium such as DVD, a photomagnetic recording medium such as MO, a magnetic recording medium such as magnetic tape, and a semiconductor memory such as IC card and miniature card. A program for causing CPU to execute a part or all of operations described in the following description may be stored in the "computer usable medium".

The term "module" in this specification including the claims may be a hardware module consisting of single or multiple circuits, a software module to be executed by a computer such as CPU, or a combination thereof. A single module may be realized by one or more software elements, hardware elements or a combination thereof, and a plurality of modules may be realized by one software element, one hardware element or a combination thereof.

According to another aspect of the present invention, there is provided an apparatus, a method and a computer usable medium for separating data to be transmitted into a plurality of segments and sending them in the form of plurality of electronic mails based upon mail size limitations of networks involved. Each network has a particular mail size limitation, and the data about the mail size limitations of various networks are stored in a memory of the apparatus (e.g., in the form of table) before-hand. The maximum size of electronic mail to be sent may be determined upon comparison of the mail size limitation of the network of the sender with that of the recipient (The smaller is taken). If the electronic mail size is larger than the determined maximum limitation, the electronic mail is segmented into a plurality of smaller electronic mails such that each of the segmented mails does not exceed the determined limitation. Segmentation may be carried out in such a way that the number of segmented mails be as small as possible. In other words, the original electronic mail would not be divided to unnecessarily small pieces. The user can transmit an electronic mail without having to be concerned about the network of the recipient or mail size restrictions of the networks.

The communication terminal device, communication method and computer usable medium are disclosed in Japanese Patent Application Nos. 9-188379 filed Jul. 14, 1997 and 9-190087 filed Jul. 15, 1997, and the entire disclosures thereof are incorporated herein by reference.

BRIEF DESCRIPTION OF THE DRAWINGS

FIGS. 2(a) to 2(d) show various tables of information stored in the facsimile machine of the first embodiment.

FIGS. 5(a) to 5(c) illustrate electronic mail addresses after modification for communication between different networks; specifically

FIGS. 7(a) to 7(c) illustrate various tables of information provided in the facsimile machine of the second embodiment.

DETAILED DESCRIPTION OF THE INVENTION

Figure 1A:
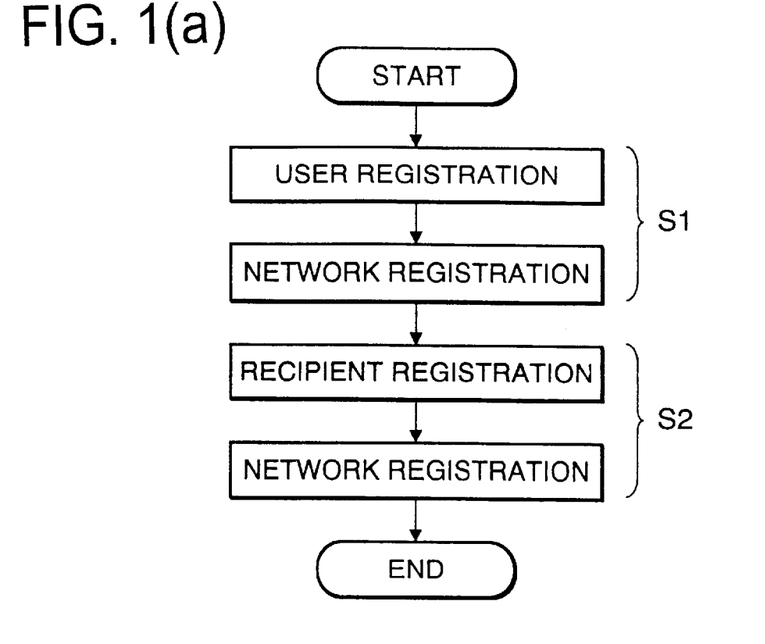
FIG. 1(a) is a brief operational flow chart of a facsimile machine of a first embodiment according to the present invention during basic data registration.
Figure 1B:
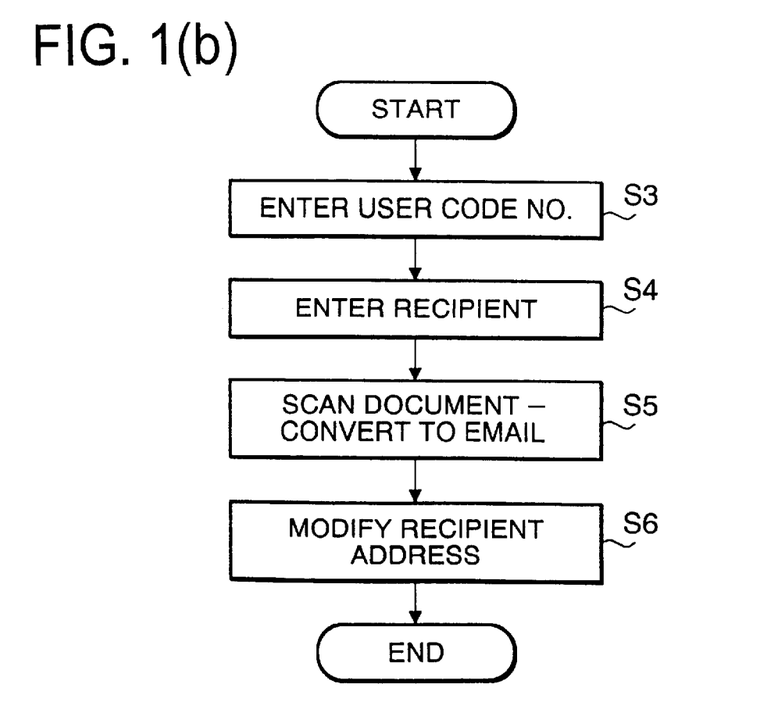
FIG. 1(b) is a flow chart for electronic mail transmission of the facsimile machine of the first embodiment.
Figure 2A:
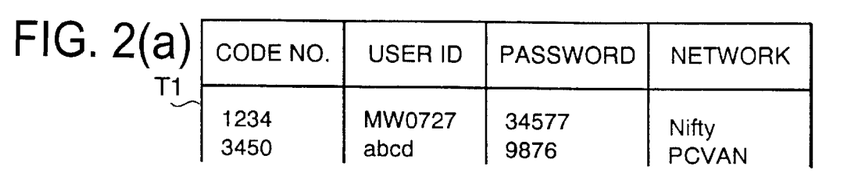
FIG. 2(a) is a table of data about users.
Figure 2B:
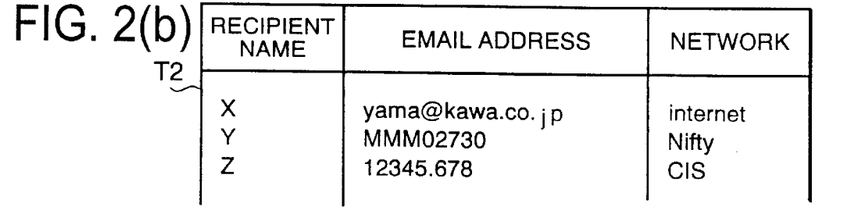
FIG. 2(b) is a table of data about recipients.
Figure 2C:
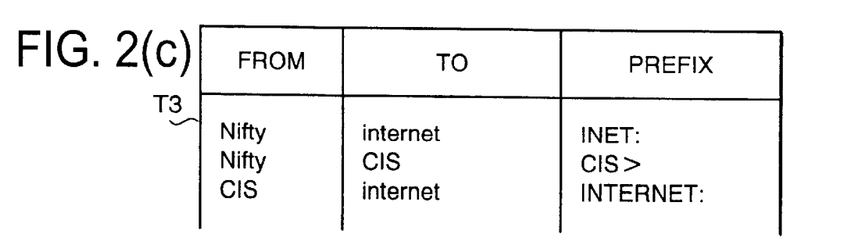
FIG. 2(c) is a table of prefix data.
Figure 2D:
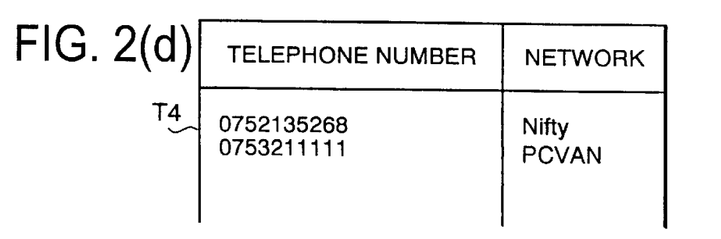
FIG. 2(d) is a table of telephone numbers (access table)
Figure 3:
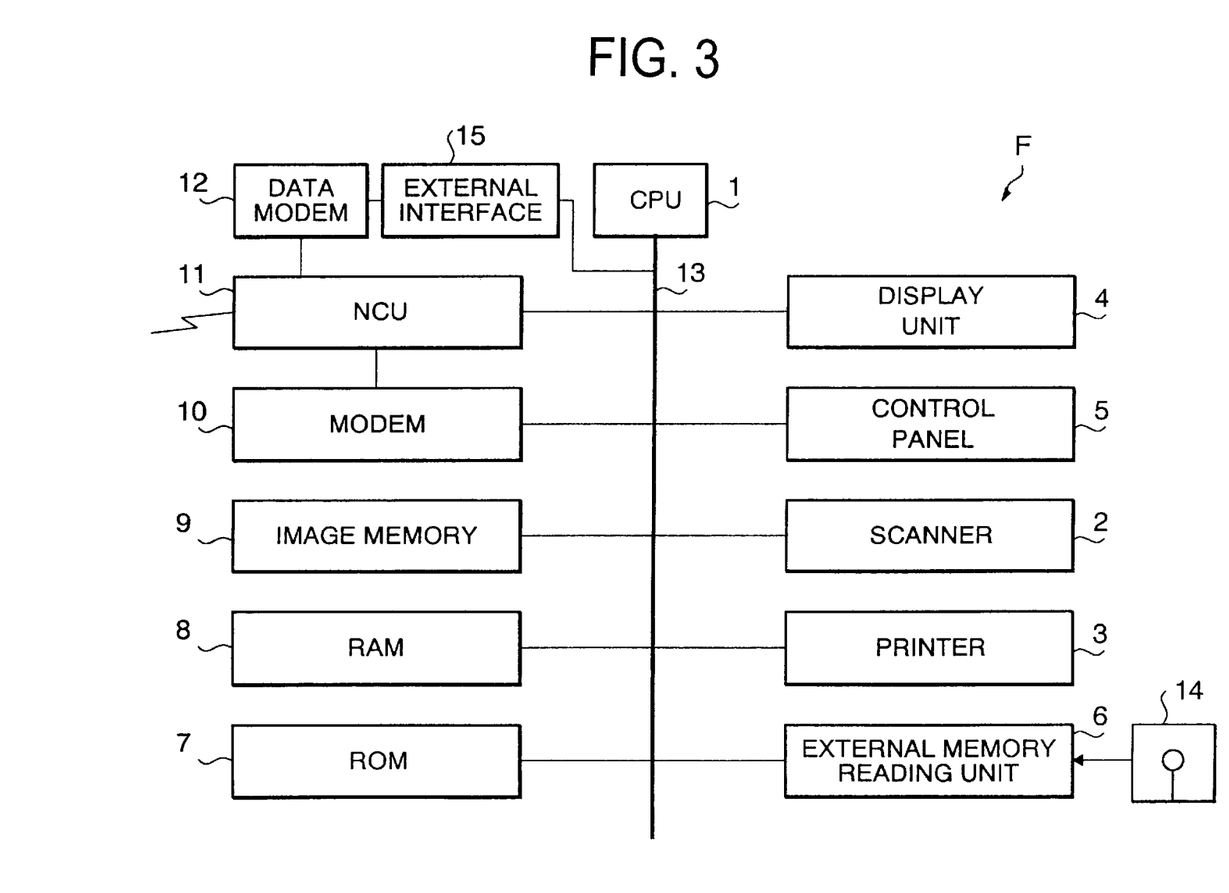
FIG. 3 illustrates a circuit diagram of the facsimile machine of the first embodiment.

A first embodiment of the present invention is described in detail below based upon FIGS. 1(a) to FIG. 5(c) of the accompanying drawings. In the present embodiment, the communications terminal device is an electronic mail-capable facsimile machine F provided with G3 and G4 facsimile communications capability and electronic mail capability (FIG. 3). The flow of operations in this facsimile machine F are illustrated in FIGS. 1(a) and 1(b). FIG. 1(a) illustrates the flow of a basic data registration operation to store users, recipients and kinds of their networks in a memory of the facsimile machine (in the form of tables), and FIG. 1(b) illustrates an electronic mail transmission operation. The tables for storing these basic data are shown in FIGS. 2(a) to 2(d) respectively. FIG. 2(a) illustrates a user table T1 wherein the data about the users of the facsimile machine F is stored, FIG. 2(b) illustrates a recipient table T2 wherein the recipients data is stored, FIG. 2(c) illustrates a prefix table T3 wherein prefixes of character strings used to transmit electronic mails between different networks are stored, and FIG. 2(d) illustrates an access table T4 wherein telephone numbers of providers and access points are stored. The circuit layout of the present facsimile machine F is shown in FIG. 3.

As depicted in FIG. 3, the facsimile machine F includes CPU 1, a scanner 2, a printer 3, a display unit 4, a control panel 5, an external memory reading unit 6, ROM 7, RAM 8, an image memory 9, a modem 10, NCU 11, and a data modem 12.

CPU 1 controls each of the hardware elements over a bus 13 and can execute software (software program) procedures like encoding, decoding, image format conversion (TIFF conversion), binary text conversion, mail editing and auto-dial communications procedures. Further, the CPU 1 can perform the basic data registration procedure and data transmission procedure.

The scanner 2 is an image scanner like a CCD for scanning a document to produce image data (black and white binary data).

The printer 3 is provided with an electro-photography type printer and can record (output) image data received from other G3 and G4 type facsimile machines or image data obtained as electronic mails.

The display unit 4 is provided with a display such as an LCD, and displays an operational command to the user such as "INPUT USER ID", a current operating condition of the facsimile machine F such as "FAX MODE", the image data, and the registered information.

The control panel 5 is provided with a number pad for entering digits, speed-dial keys for speed dialing, one-touch function keys, other function keys, and a start key. By operating the function keys, the user is able to set a registration mode for inputting telephone numbers and electronic mail addresses, and select a communications mode. The number pad, speed-dial keys, and one-touch function keys provide letter (e.g., alphabet) input capability.

The external memory reading unit 6 can read-in programs and the like stored on an external storage media 14 such as floppy disks or CD-ROMs (program storage media). Consequentially, the programs executed by the CPU can be provided from the external storage media 14.

ROM 7 is also a program storage medium for storing programs executed by the CPU in order to operate the facsimile machine F.

RAM 8 temporarily stores data generated during execution of the programs by the CPU and is comprised of SRAM or flash-memory or the like. RAM 8 also stores various data registered by the user in tabular form. Further, RAM 8 can store programs read-in from the external storage media, and provide them to CPU when required.

The image memory 9 stores image data, and is comprised of DRAM or the like.

The modem 10 is used for facsimile data communications of image data and is provided with fax-modem capabilities.

NCU (Network Control Unit) 11 can close and release analog telephone circuits.

The data modem 12 is provides data modem capability, and can be used to communicate image data as electronic mails. The data modem 12 is connected to an external telephone terminal of the NCU, and is further connected to a serial port of an external interface unit 15 by means of an RS232C connector. When G4 communications is performed, the facsimile machine F (or data modem) is connected to an ISDN line via a DSU (Digital Service Unit) not shown in the diagram.

Next, the programs executed by the CPU are described.

In coding and decoding, image data is coded and decoded according to coding methods like MH, MR, MMR, etc. Image data encoded by such encoding methods is called G3-type image data. This G3 image data is stored in the image memory.

In image conversion, G3 image data is converted to a TIFF (Tagged Image File Format) image which can be used by common computers when the image is transmitted. When an image is received, the image data is converted from TIFF format to G3 image data. TIFF has been put in the public domain by Adobe Systems, Inc., and has defined classes for treating binary black and white, gray-scale, and full-color images. One of the standard classes defined by Adobe for G3 image data is Class F which deals with G3 image data obtained by encoding an original image by the MH, MR, MMR, etc. encoding methods. Consequentially, by appending Class F TIFF header information at the top of the G3 image data, the C3 image can be converted into TIFF format.

In binary-text conversion, binary data is converted into text data when an electronic mail is sent, and text data is converted to binary data when an electronic mail is received. Computers which cannot handle binary data electronic mails exist on the Internet. Thus, when TIFF-formatted (binary) image data is sent as electronic mail, the image data is first converted to text data in order to ensure that the electronic mail will reach a recipient. Text data handled by the Internet has been specified as 7-bit code in RFC (Request For Comments) 822 published by IETF (Internet Engineering Task Force). MIME (Multipurpose Internet Mail Extensions) base 64 is, for instance, used for the conversion. According to MIME, 6-bit binary data is converted to text data by assigning one of the 64 characters (capital letters, lowercase letters, the numbers, "+" and "/") to one of the values in the 6-bit binary data. MIME is specified, for example, by RFC1521.

In mail editing, mail header information is appended to the text data converted from the TIFF formatted image data so that the TIFF image data is edited to the electronic mail format when an electronic mail is sent, and the mail header information is cut out of the electronic mail formatted data such that only the text data-converted TIFF image data is extracted when an electronic mail is received. Since pre-defined header information must be appended as administrative information for electronic mails on the Internet, "From: (user address)," "To: (recipient address)," and "Subject: (title of electronic mail or subject information)" are appended to the top of the text data-converted TIFF image when an electronic mail is sent. Further, in the present embodiment a prefix is also appended to the recipient address when the recipient is located at a different network from the sender.

In auto-dialing, in order to call the telephone number read off the table, the telephone number data is sent to the NCU 11 or the modem 10.

The operations (programs) for basic data registration and electronic mail transmission according to the present embodiment will be described below in detail.

Next, organizations of the tables in the memory for storing the basic data will be described.

As illustrated in FIG. 2(a), the user table T1 is comprised of code numbers specifying the individual users who share the facsimile machine F, user IDs, their passwords, and network types used by the users. Consequentially, when a user wants to transmit an electronic mail and enters his or her code number, the CPU can obtain the user ID, password, and network.

Referring to FIG. 2(b), the recipient table T2 is comprised of the recipient names, the electronic mail addresses of those recipients, and the network used by each of the recipients. Consequentially, the electronic mail address, and network of recipients can be obtained just by entering the name of the person to whom the user wants to send an electronic mail.

Referring to FIG. 2(c), the prefix table T3 is comprised of the networks of the sender ("FROM" column), the networks of the receiver ("To" column), and the prefixes. Consequentially, necessary prefix information can be obtained from the networks used by the transmitting and receiving parties.

As shown in FIG. 2(d), the access table T4 is comprised of telephone numbers and network names. Consequentially, the telephone number of the ISP or access point can be obtained from the network used for transmission.

It is also possible to arrange information such as the individual user names, speed-dial numbers, one-touch numbers for recipients, facsimile telephone numbers, facsimile types, and provider names in the tables described above.

Next, the registration procedure is described in reference to FIG. 1(a).

When a data registration mode is selected by the pressing of a corresponding function key on the control panel, a particular program is activated for data registration, and the display unit and the control panel are enabled to be used for the registration operation. At this time, the user IDs, passwords, along with the network names, are entered (S1). Then, the recipient's address and network name are entered with the recipient name (S2). It is possible to have the user select from a prepared list of different networks, or for the user to enter a new network not included in the predetermined list. The data input in these registration procedure is stored in the user table T1, the recipient table T2 and the access table T4. The prefix table T3 can store default prefix data for common networks such as Nifty, CIS and Internet as illustrated. If an additional network (e.g., AOL or American On Line) should be registered in the prefix table T3, six prefixes are added to the table T3: one for from Nifty to AOL, one for from AOL to Nifty, one for from Internet to AOL, one for From AOL to Internet, one for from CIS to AOL and one for from AOL to CIS.

Next, the electronic mail transmission procedure is described in reference to FIG. 1(b).

When an electronic mail transmission mode is selected by pressing a corresponding function key on the control panel, the electronic mail transmission program is initiated, enabling the display unit and the control panel to be used for electronic mail transmission. The user who wants to send an electronic mail inputs his own code number (S3). The user's user ID, password and network name are immediately obtained from user table T1. Thus the network of the sending party (NeT1) is confirmed. The user then inputs the recipient's name or presses a quick-dial or one-touch key (S4). The electronic mail address and network of the recipient are then immediately known from the recipient table T2. Thus the network of the receiving party (NeT2) is confirmed. When the start key is then pressed, an original document is scanned, and stored in the image memory (as G3 image data), passed through TIFF conversion and MIME conversion, and electronic mail editing begins (S5). Here, if Net 1 and Net 2 are the same, nothing is done to the recipient's address. On the other hand, if Net 1 and Net 2 are different, the CPU 11 retrieves the corresponding prefix from the prefix table T3 and appends it to the address of the recipient (S6). For example, when sending an electronic mail from NIFTY to the Internet, "INET:" is appended to the top of the address.

Next, the telephone number of the ISP or access point is read out from the access table T4, and the number is dialed. The user ID and password are then read out from the user table T1 and used to log-in to the network. Thus, the electronic mail can be sent to the ISP or access point.

Figure 4:
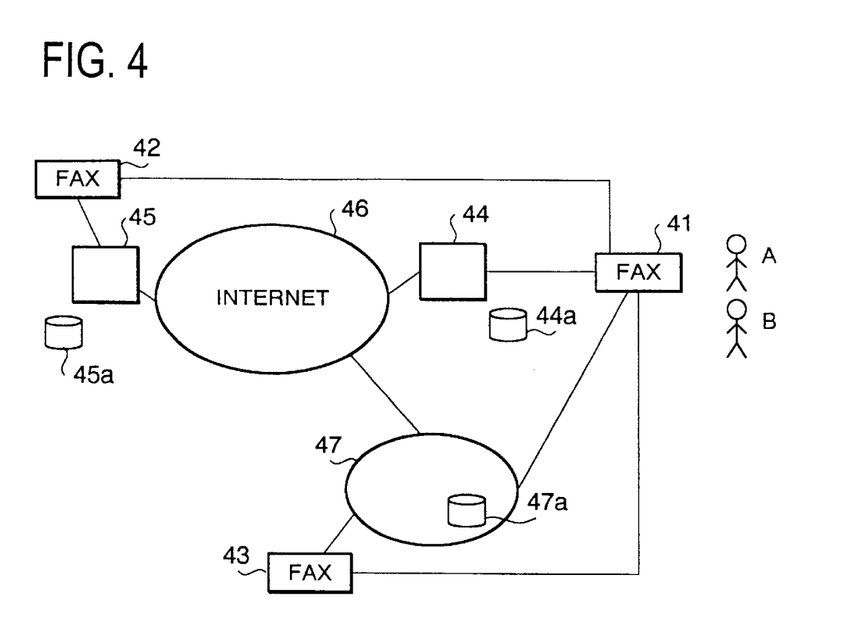
FIG. 4 illustrates a schematic diagram when the facsimile machine of the first embodiment is connected to a computer communications network.

Referring now to FIG. 4, a specific example will be described. There are three electronic mail-capable facsimile machines 41, 42, 43 which are enabled to perform facsimile communications with each other over a telephone line. The facsimile machines 41 and 42 are connected to the Internet 46 via servers 44 and 45, respectively, and the facsimile machines 41 and 43 are connected to personal computer communications service network 47. Reference numerals 44a, 45a, and 47a denote mailboxes respectively. The facsimile machine 41 can be used by two users A and B. The user A accesses the Internet 46 via his or her contracted service provider 44. The user B is a member of the personal computer communications service network 47. When the user A sends image data via electronic mail to the facsimile machine 43, or when the user B sends image data via electronic mail to the facsimile machine 42, the network of the sender and the network of the recipient differ, and therefore a prefix must be added to the electronic mail address of the recipient, as described above.

Figures 5A, 5B, 5C:
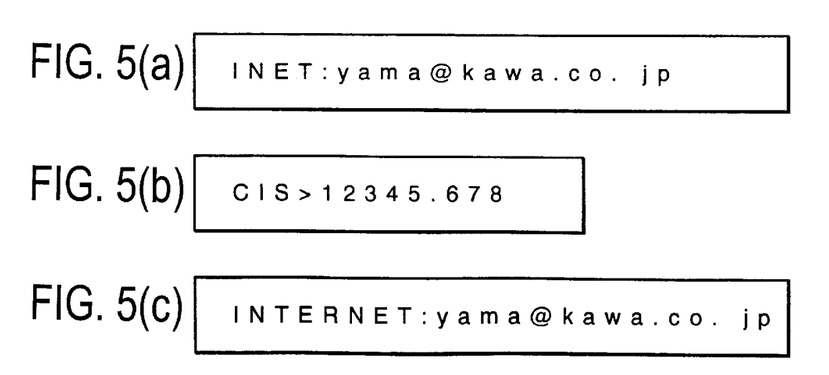
FIG. 5(a) is an address used to transmit an electronic mail from NIFTY to Internet.
FIG. 5(b) is an address used to transmit an electronic mail from NIFTY to CIS.
FIG. 5(c) is an address used to transmit an electronic mail from CIS to Internet.

FIGS. 5(a) to 5(c) illustrate examples in which a prefix has been appended to an electronic mail address.

The address in FIG. 5(a) is used when sending an electronic mail from NIFTY to the Internet; the address in FIG. 5(b) is used when sending an electronic mail from NIFTY to CIS; and the address in FIG. 5(c) is used when sending an electronic mail from CIS to the Internet.

A second embodiment of the present invention is described in detail below in reference to FIGS. 6(a) through 7(c) as well as FIG. 4. Descriptions of the parts of this embodiment which are the same as those of the first embodiment are omitted, and similar reference numerals are assigned to similar parts in the first and second embodiments.

In this embodiment, the communications terminal unit is a facsimile machine F provided with G3 and G4 facsimile communications capability and electronic mail capabilities. The two fundamental operations of this facsimile machine F are illustrated in the flow charts of FIGS. 6(a) and 6(b). The tables provided in the memory of this facsimile machine F for storing basic information are illustrated in FIGS. 7(a) to 7(c). Specifically, FIG. 7(a) illustrates a user table T5 which stores the user data, FIG. 7(b) illustrates a recipient table T6 which stores the recipient data, and FIG. 7(c) illustrates a mail size limitation table 7 which stores the mail size restrictions of the different networks.

Next, the table organization is described.

As shown in FIG. 7(*a*), the user table T5 includes the user codes specifying the individual users who share the facsimile machine F, as well as the user IDs, the passwords and the users' networks. Accordingly, the user ID, password, and network name of a user are acquired by entering the user code of the user from whom the mail is to be sent.

As depicted in FIG. 7(*b*), the recipient table T6 includes the recipient names, their electronic mail addresses and their networks. Consequentially, the electronic mail address and network for a recipient can be obtained by just inputting the name of the intended recipient of the electronic mail.

As depicted in FIG. 7(*c*), the mail size limitation table T7 includes the sender's network name, the recipient network name, and the corresponding mail size restrictions. The smaller of the electronic mail data limit of the sender's network and the electronic mail data limit of the recipient's network is stored as the maximum data size restriction. Thus, the maximum data size of an electronic mail is obtained from the networks of the electronic mail sender and the electronic mail recipient.

It should be noted that in each of the tables T5–T7 individual user names, speed-dial numbers, one-touch numbers, facsimile (telephone) numbers, facsimile types, provider names, and the like may be additionally stored.

Figure 6A:
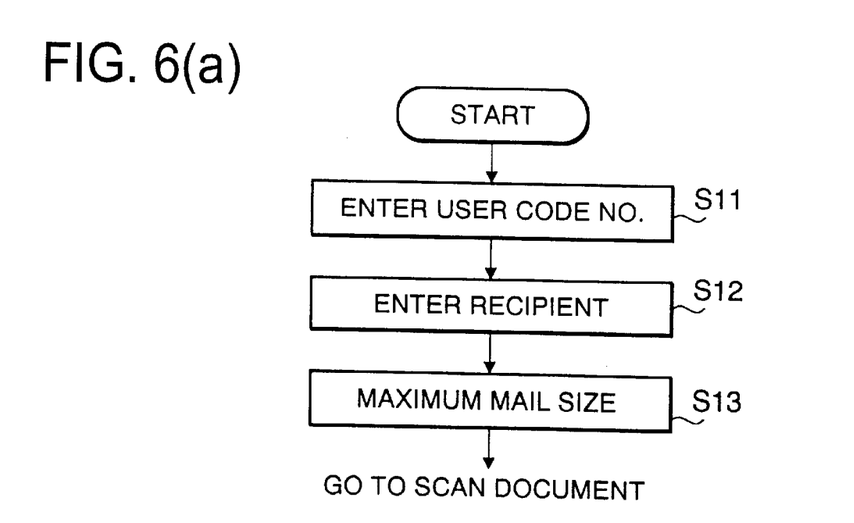
FIG. 6(a) shows a flow chart for a second embodiment of a facsimile machine of the present invention when it determines a maximum mail size.
Figure 6B:
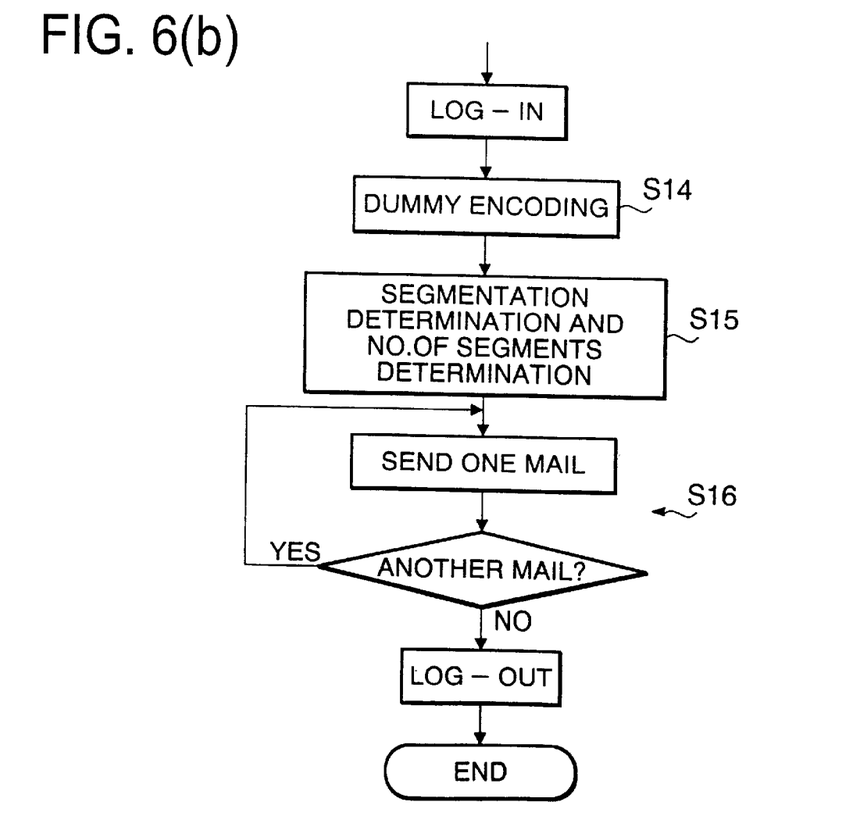
FIG. 6(b) shows the operation flow for the facsimile machine of the second embodiment when it segments the electronic mail.
Figure 7A:
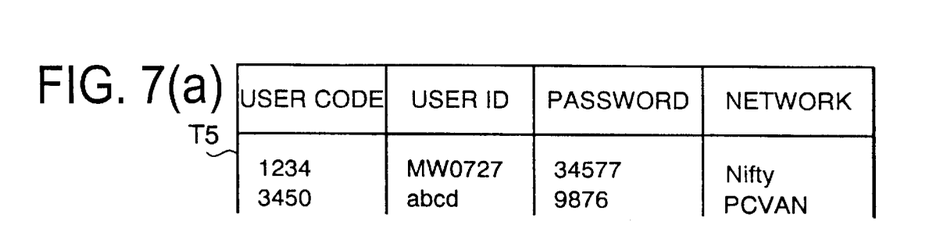
FIG. 7(a) is a table of data about users.
Figure 7B:
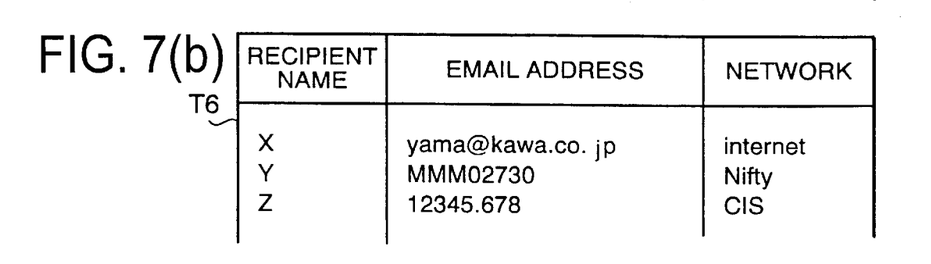
FIG. 7(b) is a table of data about recipients.
Figure 7C:
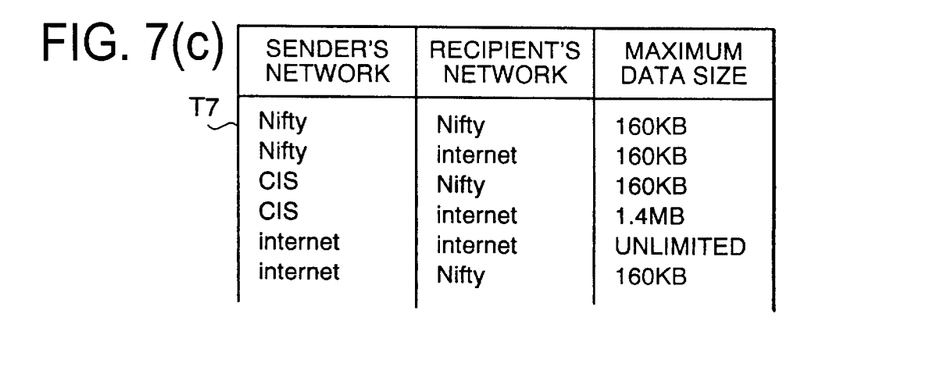
FIG. 7(c) is a table of data about corresponding mail size limitations.

Next, the electronic mail transmission operation including the segmentation determination and actual segmentation is described in reference to FIGS. 6(*a*) and 6(*b*).

When the electronic mail transmission mode is selected by pressing a corresponding function key on the control panel, the electronic mail transmission program is initiated, enabling the display unit and the control panel to be used for electronic mail transmission. As shown in FIG. 6(*a*), the user who wants to send an electronic mail inputs his own code number (S11). The user ID, password and network name of this user are immediately obtained from the user table T5. Thus the network of the sending party (Net1) is confirmed. The user then inputs the recipient's name or presses a speed-dial or one-touch key (S12). The electronic mail address and network name of the recipient are then immediately acquired from the recipient table T6. Thus the network of the receiving party (Net2) is confirmed. The maximum allowable size of an electronic mail sent from Net 1 to Net 2 is then obtained by referencing the maximum mail size table T7 which lists the permissible maximum mail sizes for combinations of Net 1 and Net 2 services (S13).

Next, when the start key is then pressed, an original document is scanned, and stored in the image memory (as G3 image data), passed through TIFF conversion, MIME conversion, and electronic mail editing, the telephone number is dialed, the logging in procedure is conducted, and the electronic mail is transmitted. (Note that in the case of one-touch dialing, the start key need not be pressed.)

This process, from scanning the original document to sending the electronic mail, as illustrated in FIG. 6(*b*) begins with dummy encoding (S14). The dummy encoding converts all image data stored in the image memory to TIFF format, and then to MIME format. The data size (volume) of the text data generated from the MIME conversion is then determined. The segmentation determining program (S15) then determines whether or not to segment the electronic mail into multiple electronic mails by comparing the size of the text data to the maximum allowable size of an electronic mail for this particular transmission. If the text data is smaller than or equal to the maximum allowable mail size, then there is no need to segment the electronic mail. On the other hand, if size of the text data is larger than the maximum allowable size, then the electronic mail is segmented. In the mail segmentation, the electronic mail is divided into the smallest number of segments required to segment the electronic mail within the maximum allowable single-mail size. For example, if the maximum allowable size is 160 KB and the text data is 470 KB, then the electronic mail is divided into 3 segments (S15). Thus the image data stored in the image memory is segmented into the appropriate number of segments, (3 segments in this example, for instance), and each segment is converted to TIFF format, then to MIME format to create the individual electronic mail. By adding the segment information to the Subject field of the electronic mail header such as "$\frac{1}{3}$", "$\frac{2}{3}$" or "$\frac{3}{3}$" in turn, the electronic mail can indicate which segment it represents and how many segments are in the complete mail. In this manner, all the image data stored in the image memory are converted into a plurality of electronic mail segments and transmitted in the form of plurality of electronic mails as required. After transmitting a single original image by a single or a plurality of electronic mails, the logging out procedure is carried out (S16).

A concrete example will be described in reference to FIG. 4. The three electronic mail-capable facsimile machines 41, 42, 43 are enabled to perform facsimile communications with each other over a telephone line. The facsimile machines 41 and 42 are connected to the Internet 46 via the servers 44 and 45, respectively, and the facsimile machines 41 and 43 are connected to the personal computer communications service network 47. Reference numerals 44*a*, 45*a*, and 47*a* designate mailboxes respectively. The facsimile machine 41 can be used by users A and B. The user A accesses the Internet 46 via the contracted service provider 44. The user B is a member of the personal computer communications service network 47. Thus, when the user A sends image data via electronic mail to the facsimile machine 43, or when the user B sends image data via electronic mail to the facsimile machine 42, the facsimile machine 41 must determine whether or not to segment the data before transmission based on the size table T7 since the network of the sender and the network of the recipient differ, as described above.

As described above, the facsimile machine F of the present embodiment is able to reliably transmit electronic mail even if the electronic mail size restrictions of the networks used by the sender and the recipient differ. Further, since electronic mail segmentation is determined based upon the mail size restrictions listed in the size table T7 for both the sender and the recipient, unnecessary segmentation is prevented. Unnecessary segmentation would occur, for example, when the maximum mail size remains fixed at that of the size of a service with a small restriction even if services with larger limits are used. The facsimile machine F of the present embodiment determines whether or not to segment the electronic mail based upon the mail size limitations of both the network of the sender and the network of the recipient, and further determines the number of segments into which the data will be divided as small as possible. Therefore, it is feasible to reliably minimize the number of the electronic mail segments created.

When the user inputs the recipient address directly without inputting the user code, the recipient name, and without using speed-dial or one-touch keys, the user table T5 and recipient table T6 are not referred to, and therefore the network names of the sender and recipient are not known.

However, if the electronic mail is sent to a network different from that of the sender, a prefix is attached to the address of the recipient, and so the facsimile machine F is able to know the network names of the sender and recipient by analyzing the prefix. Accordingly, it is possible to determine if the networks are in fact different. For example, if the sender is at NIFTY and "INET:" is appended to the top of the electronic mail address, then it is known that the recipient must be on the Internet. Consequentially, the facsimile machine F can use the size table T7 to determine the maximum size of the electronic mail to be sent. If the network and/or the mail size limitation is still unclear, the maximum mail size may be set to the smallest value.

In the embodiment described above, the data of the maximum mail size itself is stored in connection with the network names of the sender and recipient in the size limitation table T7. However, the mail size limitation for each network may only be stored in this table, and the maximum mail size limitation may be determined by comparing the mail size limitation of the sender with that of the recipient and taking the smaller value.

Further, the present invention is applicable to other than facsimile machines; the present invention also proposes a program recording medium (computer usable medium) which stores the above-mentioned procedures, as well as a communications terminal device equipped with a computer which uses such a medium.

What is claimed is:

1. An electronic mail-capable communications terminal device comprising:

first storage means for storing data specifying kinds of networks used by a plurality of users of the electronic mail-capable communications terminal device in connection to the plurality of users respectively, each user using a particular kind of network to send an electronic mail;

second storage means for storing data specifying kinds of networks used by a plurality of recipients in connection to the plurality of recipients respectively, each recipient using a particular kind of network to receive an electronic mail; and means for modifying an electronic mail address of an intended recipient such that an electronic mail is transmitted to a network of an intended recipient when a network of a user who is sending an electronic mail and that of an intended recipient are different, wherein the means for modifying the recipient's electronic mail address stores a plurality of predetermined character strings each used for electronic mail transmission between particular two different networks, and selects and appends an appropriate character string to a recipient's electronic mail address according to a network used by a user sending an electronic mail and that of an intended recipient.

2. The electronic mail-capable communications terminal device of claim 1, wherein the predetermined character string is a prefix added to a top of the electronic mail address.

3. An electronic mail-capable communications terminal device comprising:

first storage means for storing data specifying kinds of networks used by a plurality of users of the electronic mail-capable communications terminal device in connection to the plurality of users respectively, each user using a particular kind of network to send an electronic mail;

second storage means for storing data specifying kinds of networks used by a plurality of recipients in connection to the plurality of recipients respectively, each recipient using a particular kind of network to receive an electronic mail;

means for modifying an electronic mail address of an intended recipient such that an electronic mail is transmitted to a network of an intended recipient when a network of a user who is sending an electronic mail and that of an intended recipient are different;

means for comparing a maximum permissible electronic mail data size of a network used by a user with that of a network used by an intended recipient;

means for taking the smaller data size as a mutual data size limitation;

segmentation means for segmenting an electronic mail to a plurality of smaller electronic mails if a data size of an electronic mail is greater than the mutual data size limitation; and means for transmitting the plurality of smaller electronic mails to an intended recipient in the form of plurality of electronic mails if an electronic mail is segmented by the segmentation means.

4. The electronic mail-capable communications terminal device of claim 3, wherein the segmentation means segments the electronic mail in such a manner that a data size of each of the smaller electronic mails obtained by segmentation does not surpass the mutual data size limitation.

5. The electronic mail-capable communications terminal device of claim 3 further including means for including segment information at a header of a segmented electronic mail if an electronic mail is segmented to a plurality of smaller electronic mails and transmitted by a plurality of electronic mails.

6. The electronic mail-capable communications terminal device of claim 3, wherein the segmentation means segments an electronic mail in such a manner that a data size of each of the smaller electronic mails obtained by segmentation is as close as possible to the mutual size limitation.

7. For use in a single communication terminal device shared by a plurality of users, an electronic mail communications method for sending an electronic mail from one of users to one of recipients through networks, each user using a particular network when it sends an electronic mail and each recipient using a particular network when it receives an electronic mail, comprising the steps of:

A) storing data specifying a plurality of users together with networks used by the plurality of users;

B) storing data specifying a plurality of recipients together with networks used by the plurality of recipients; and C) modifying an electronic mail address of an intended recipient such that an electronic mail is transmitted to a network of an intended recipient when a network of a user who is sending an electronic mail and that of an intended recipient are different; and D) storing a plurality of predetermined character strings each used for electronic mail transmission between particular two different networks before the step C, and wherein the step C includes the substep of selecting an appropriate character string according to a network used by a user sending an electronic mail and that used by an intended recipient and the substep of appending the appropriate character string to a recipient's electronic mail address.

8. The electronic mail communications method of claim 7, wherein the predetermined character string is a prefix added to a top of the electronic mail address.

9. The electronic mail communications method of claim 7 further including the steps of:
   E) comparing a maximum permissible electronic mail data size of a network used by a user with that of a network used by an intended recipient;
   F) taking the smaller data size as a mutual data size limitation;
   G) segmenting an electronic mail into a plurality of smaller electronic mails if a data size of an electronic mail is greater than the mutual data size limitation; and
   H) transmitting the plurality of smaller electronic mails to an intended recipient in the form of plurality of electronic mails if an electronic mail is segmented in the step G.

10. The electronic mail communications method of claim 9, wherein electronic mail segmentation in the step G is carried out in such a manner that a data size of each of the smaller electronic mails obtained by segmentation does not surpass the mutual size limitation.

11. The electronic mail communications method of claim 9 further including the step of including segment information at a header of a segmented electronic mail between the steps G and H.

12. The electronic mail communications method of claim 9, wherein electronic mail segmentation in the step G is carried out in such a manner that a data size of each of the smaller electronic mails obtained by segmentation is as close as possible to the mutual size limitation.

13. A communications terminal device comprising:
   transmission means for transmitting an electronic mail to an intended recipient from an electronic mail sender through a computer network of an electronic mail sender and a computer network of an intended recipient;
   determination means for determining whether or not to segment an electronic mail to be transmitted into a plurality of smaller electronic mails based upon a maximum permissible electronic mail data size of a network used by an electronic mail sender and that of a network used by an intended recipient; and
   segmentation means for segmenting the electronic mail into a plurality of smaller electronic mails when the determination means determines that the electronic mail should be segmented,
   wherein the determination means compares a maximum permissible electronic mail data size of a network used by an electronic mail sender with that of a network used by an intended recipient, takes the smaller data size as a mutual size limitation, and determines that the electronic mail should be segmented when the electronic mail is greater than the mutual size limitation.

14. The communications terminal device of claim 13, wherein the segmentation means segments the electronic mail in such a manner that a data size of each of the smaller electronic mails obtained by segmentation does not surpass the mutual size limitation.

15. A communications terminal device comprising:
   transmission means for transmitting an electronic mail to an intended recipient from an electronic mail sender through a computer network of an electronic mail sender and a computer network of an intended recipient;
   determination means for determining whether or not to segment an electronic mail to be transmitted into a plurality of smaller electronic mails based upon a maximum permissible electronic mail data size of a network used by an electronic mail sender and that of a network used by an intended recipient;
   segmentation means for segmenting the electronic mail into a plurality of smaller electronic mails when the determination means determines that the electronic mail should be segmented; and
   means for including segment information at a header of a segmented electronic mail.

16. The communications terminal device of claim 13, wherein the segmentation means segments the electronic mail in such a manner that a data size of each of the smaller electronic mails obtained by segmentation is as close as possible to the mutual size limitation.

17. An electronic mail communications method comprising the steps of:
   A) determining whether or not to segment an electronic mail to be transmitted into a plurality of smaller electronic mails based upon a maximum permissible electronic mail data size of a network used by an electronic mail sender and that of a network used by an intended recipient;
   B) segmenting the electronic mail into a plurality of smaller electronic mails when the step B determines that the electronic mail should be segmented; and
   C) transmitting a plurality of segmented electronic mails to an intended recipient by a plurality of electronic mails, wherein the step A includes:
      comparing a maximum permissible electronic mail data size of a network used by an electronic mail sender with that of a network used by an intended recipient;
      taking the smaller data size as a mutual size limitation; and
      determining that the electronic mail should be segmented when the electronic mail is greater than the mutual size limitation.

18. An electronic mail communications method comprising the steps of:
   A) determining whether or not to segment an electronic mail to be transmitted into a plurality of smaller electronic mails based upon a maximum permissible electronic mail data size of a network used by an electronic mail sender and that of a network used by an intended recipient;
   B) segmenting the electronic mail into a plurality of smaller electronic mails when the step B determines that the electronic mail should be segmented; and
   C) transmitting a plurality of segmented electronic mails to an intended recipient by a plurality of electronic mails, wherein the step B segments the electronic mail in such a manner that a data size of each of the smaller electronic mails obtained by segmentation does not surpass the mutual size limitation.

19. An electronic mail communications method comprising the steps of:
   A) determining whether or not to segment an electronic mail to be transmitted into a plurality of smaller electronic mails based upon a maximum permissible electronic mail data size of a network used by an electronic mail sender and that of a network used by an intended recipient;
   B) segmenting the electronic mail into a plurality of smaller electronic mails when the step B determines that the electronic mail should be segmented;
   C) transmitting a plurality of segmented electronic mails to an intended recipient by a plurality of electronic mails; and D) including segment information at a header of a segmented electronic mail between the steps of B and C.

20. An electronic mail communications method comprising the steps of:

A) determining whether or not to segment an electronic mail to be transmitted into a plurality of smaller electronic mails based upon a maximum permissible electronic mail data size of a network used by an electronic mail sender and that of a network used by an intended recipient;

B) segmenting the electronic mail into a plurality of smaller electronic mails when the step B determines that the electronic mail should be segmented; and C) transmitting a plurality of segmented electronic mails to an intended recipient by a plurality of electronic mails, wherein the step B is carried out in such a manner that a data size of each of the smaller electronic mails obtained by segmentation is as close as possible to the mutual size limitation.

* * * * *